April 28, 1970     T. C. McNULTY     3,509,450

THYRISTOR CONTROLLED VOLTAGE REGULATING CIRCUIT

Filed March 22, 1968

INVENTOR
Thomas C. McNulty
BY Edward J. Norton
ATTORNEY

United States Patent Office 3,509,450
Patented Apr. 28, 1970

3,509,450
THYRISTOR CONTROLLED VOLTAGE
REGULATING CIRCUIT
Thomas C. McNulty, Middlesex, N.J., assignor to
RCA Corporation, a corporation of Delaware
Filed Mar. 22, 1968, Ser. No. 715,327
Int. Cl. G05f 1/44, 1/64
U.S. Cl. 323—22
7 Claims

ABSTRACT OF THE DISCLOSURE

Disclosed is a switching circuit for supplying power to a load independent of the magnitude of the applied voltage source. The circuit comprises a thyristor element connected substantially in parallel with the load to be supplied; variable time delay means, responsive to the magnitude of the applied voltage source, for determining the conduction angle of the thyristor; and regulating means, responsive to the magnitude of the applied voltage source, for regulating the power supplied to the load when the thyristor is in a nonconducting state.

Background of the invention

Figure 1:
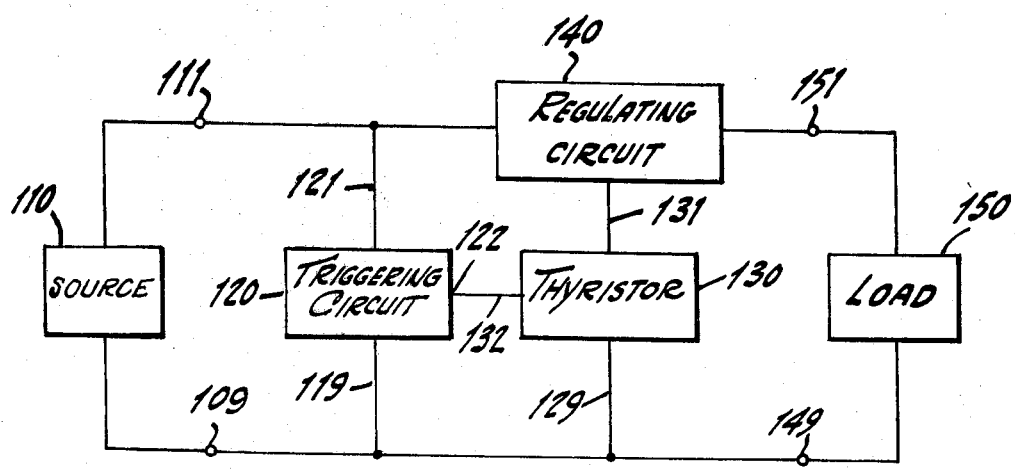

In the manufacture of electrical equipment one problem constantly confronting circuit designers is to design a product that will operate satisfactorily, within acceptable tolerances, despite variations which may occur in the magnitude of the voltage source used to supply the equipment in question. Even in a limited geographical area which is theoretically supplied with alternating current at a nominal voltage level, it is not unusual for the actual voltage level to vary from house to house by as much as ten percent. These variations can result as a function of many different parameters. For example, a change in the amount of loading applied to a distribution line over a period of time as a result of normal load growth within the service area; or the location of the AC outlet on the line relative to the step down transformer of the power company; or as a result of an improper transformer tap setting on either a high voltage or distribution transformer. These conditions are neither unusual nor generally considered urgent enough to warrant immediate correction by the power company. Greater discrepancies are not uncommon during periods when the power company may be suffering from circuit or transformer outages, or generating unit shutdowns, either as a result of normal periodic maintenance procedures or perhaps because of emergency outage conditions which may arise within the service area. In the case of a system supplying a nominal voltage of 110 volts AC, this could mean that the actual voltage supplied at the household outlet may vary between 99 and 121 volts; on a 220 volt system the variation could be between 198 and 242 volts.

The problem of the designer is further accentuated in the case of appliances, particularly where they are portable in nature and may be transported from area to area wherein the nominal voltage supplies may differ. Travelers in foreign countries, for example, often encounter AC systems which may vary between 90 and 300 volts.

To alleviate the foregoing problems, particularly in the case of the latter situation, manufacturers often provide, along with the appliance, a voltage converter which may be used where it is anticipated that the appliance will be supplied by voltage sources of different magnitudes. This is particularly true in the case of small appliances such as electric razors, electric tooth brushes, travel irons, etc. The voltage converters supplied is generally nothing more than a simple transformer having a series of operating taps which the consumer may adjust to accommodate the desired voltage level. These transformers may either be mounted within the appliance or may be provided external thereto for connection between the appliance plug and the source of supply. In either case the converters have proven to be costly for the manufacturer to supply and bothersome for the consumer to use. Furthermore, since the operation of these converters is generally manual in nature and dependent upon both the knowledge and memory of the consumer, it is not unusual for the traveler to realize his oversight in neglecting to properly set the converter until after he has attempted to operate the appliance at an improper level and already caused considerable damage thereto.

Summary of the invention

The present invention relates to switching circuits for supplying power to a load independent of the magnitude of the applied voltage source. Basically, the circuits include a thyristor element placed substantially in parallel with the load to be served; a variable time delay circuit which is responsive to the magnitude of the applied voltage source to supply a gating signal to the gate electrode of the thyristor to switch it into its conducting state; and regulating means responsive to the magnitude of the applied voltage source to regulate the power supplied to the load when the thyristor is in a nonconducting state.

Accordingly, it is an object of this invention to provide an improved switching circuit which will permit an electrical load to be operated from supply voltages of various magnitudes.

A further object of the present invention is to provide an improved switching circuit which is self-regulating and not dependent upon the user for compensation when used with supply voltages of differing magnitudes.

An additional object is to provide a self-regulating circuit which is relatively inexpensive to manufacture, occupies a relatively small volume of space, and may be easily installed within electrical appliances.

Brief description of the drawings and a preferred embodiment

Figure 2:
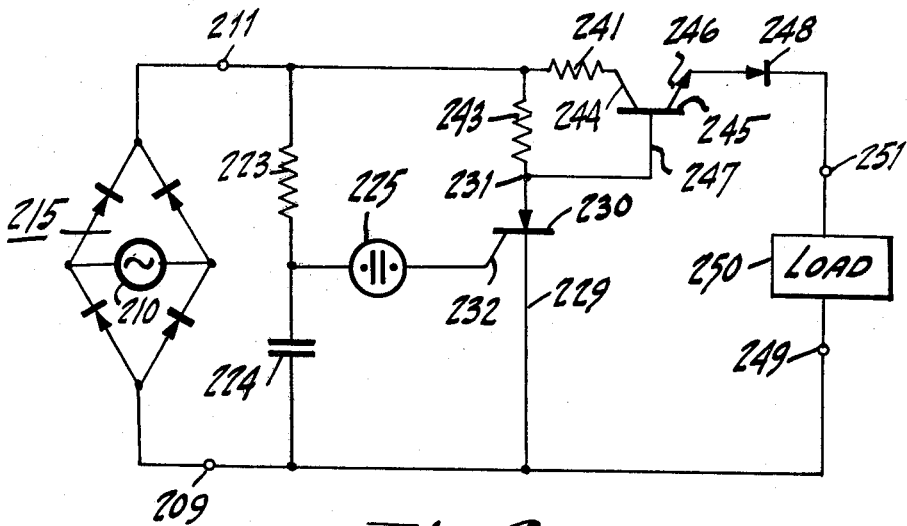

The foregoing objects, along with additional objects and applications, will become more readily apparent to those skilled in the art upon reading the specification which follows in conjunction with the accompanying two figures wherein:

FIG. 1 is a block diagram of a circuit in accordance with the present invention; and FIG. 2 is a preferred embodiment in accordance with the present invention which more specifically defines the circuit shown in FIG. 1.

Turning now to a brief description of FIG. 1, the terminals 109, 111 of a pulsating voltage source 110 are connected across terminals 119, 121 of a triggering circuit 120. The triggering circuit 120 is connected via terminal 122 to the gate electrode 132 of a thyristor element 130. As used in this disclosure the term thyristor is a generic term for a semiconductor controlled gate such as a silicon controlled rectifier (SCR) or a triac. One of the main terminal electrodes 131 of the thyristor 130 is connected to terminal 111 of the voltage source 110 and one terminal 151 of the load to be served 150 via regulating circuit means 140. The second terminal electrode 129 of the thyristor 130 is coupled to terminal 109 of the voltage source 110, terminal 119 of the triggering circuit 120, and the second terminal 149 of the load 150.

In operation, power is supplied to the load 150 via the regulating circuit 140 during periods when the thyristor 130 is in a nonconducting state; the voltage appearing across the terminals 149, 151 of the load 150 being determined by the magnitude of the voltage source 110 and the characteristics of the regulating circuit 140. At the same time that the foregoing is occurring, the triggering circuit 120, which generally will include a storage element such as a capacitor, will be charging as a function of the magnitude of the voltage source 110. When the triggering circuit 120 has charged to a predetermined level, it will provide a gating signal to the gate electrode 132 of the thyristor 130 via terminal 122. At such time the thyristor will be switched into its conducting state. Thereafter, the power supplied by the pulsating voltage source 110 will be directed through the thyristor 130, and the load 150 will receive no further power for the duration of the pulse.

In the embodiment of the present invention represented by FIG. 2 an alternating current source 210 is coupled to the input terminals 209, 211 of the circuit via a rectifier bridge 215. Terminal 211 is connected to terminal 251 of the load 250 via resistor 241, the collector 244 to emitter 246 path of transistor 245, and diode 248; the second terminal 249 of the load 250 being connected to input terminal 209. A silicon controlled rectifier 230, having an anode 231, a cathode 229, and a gate electrode 232 is connected across the input terminals; the anode 231 coupled to terminal 211 via resistor 243; and cathode 229 coupled to terminal 209. The anode 231 of the SCR 230 is further connected to the base electrode 247 of transistor 245. A resistor 223 and a capacitor 224 are connected across the input terminals 211, 209 with the resistive end connected to terminal 211. A triggering element 225, for example a neon bulb, is connected on one end to the gate electrode 232 of the SCR 230 and on its other end to the junction formed between resistor 223 and capacitor 224.

Referring now to the operation of the embodiment represented by FIG. 2, the rectifier bridge 215 assures that terminal 211 will be positive with respect to terminal 209 thereby providing a forward bias for both the SCR 230 and the transistor 245. When the SCR 230 is in a nonconducting state, power is supplied to the load 250 via resistor 241 the collector 244 to emitter 246 path of transistor 245 and diode 248; the characteristics of the transistor 245 serving as a means for regulating the voltage which will appear across the terminals of the load 250 regardless of the magnitude of the applied voltage source 210.

During the period that the load is being supplied, capacitor 224 is charged through resistor 223 as a function of the magnitude of the applied voltage source 210. When the capacitor 224 attains a predetermined charge it will cause the triggering element 225 to break down and supply a gating signal to the gate electrode 232 of the SCR 230 which will serve to trigger the SCR into a conducting state. Once the SCR 230 is switched into its conducting state the base 247 of the transistor 245 is returned to a point of low potential which results in the turning off of transistor 245. Thereafter, the load 250 will effectively be short circuited by resistor 243 and the SCR 230 for the duration of the AC half cycle. It may be shown that for fixed values of resistor 223 and capacitor 224 the point in time at which the capacitor will attain the necessary charge to trigger the SCR into conduction will depend upon the magnitude of the applied AC source. Accordingly, for voltage sources of high magnitude, the SCR will be switched into conduction relatively early in the AC half cycle and the average power supplied to the load compensated for accordingly. By properly selecting resistor 223, capacitor 224, and transistor 245, a reference output potential across the terminal of the load 250 may be established for a wide range of input voltage magnitudes. Experimental results with the circuit depicted in FIG. 2 indicate that regulation of 90±2 volts can be attained across the load for voltage sources between 90 and 250 volts. In the circuit shown in FIG. 2 diode 248 serves to protect emitter to base breakdown of the transistor while resistor 241 limits inrush currents associated with inductive loads.

What is claimed is:

1. A voltage regulator for supplying power from a cyclical voltage source to a load, comprising:
   first and second input terminals to which the voltage source may be coupled;
   first and second output terminals for connection to the load;
   a thyristor having first and second terminal electrodes coupled across said input terminals and a gate electrode;
   circuit means for providing a switching signal to said gate electrode during each cycle of said source when the voltage of said source reaches a predetermined value; and
   variable impedance means connected between said first input and first output terminals and respeonsive to the conduction state of said thyristor for disconnecting said first input terminal from said first output terminal when said thyristor is conductive and for providing a regulated voltage across the load when said thyristor is nonconductive.

2. The invention according to claim 1, wherein said second input terminal, second output terminal and one of said terminal electrodes are connected to a common point.

3. The invention according to claim 1, wherein said variable impedance means comprises a resistance connected between said first input terminal and one of said terminal electrodes, and a transistor having collector and emitter electrodes connected between said first input terminal and said first output terminal and a base electrode connected to said one terminal electrode.

4. A switching circuit for supplying power to a load at a substantially constant voltage, said circuit comprising:
   means for converting an applied voltage into pulsating D.C. signals;
   first and second input terminals to which said pulsating D.C. signals may be applied;
   first and second output terminals for connection to the load;
   a semiconductor controlled rectifier having an anode, a cathode, and a gate electrode, said second input terminal, second output terminal, and cathode being connected to a common point;
   first circuit means responsive to the magnitude of said signals for providing a gating signal to said semiconductor controlled rectifier, said circuit means coupled to said input terminals and said gate electrode; and
   second circuit means responsive to the magnitude of said D.C. signals for regulating the voltage across the load when said semiconductor controlled rectifier is in a non-conducting state,
   said second circuit means being coupled to said first input terminal, first output terminal, and said anode.

5. A switching circuit comprising:
   first and second input terminals;
   first and second output terminals;
   a first resistive element and a capacitor connected in series in the order named between said first and second input terminals;
   a semiconductor controlled rectifier having an anode, a cathode, and a gate electrode, said second input terminal, second output terminal, and cathode being connected to a common point;

a second resistive element connected on one end to said first input terminal and on its other end to said anode;

a transistor having collector, emitter, and base electrodes, said base electrode being connected to said anode, said emitter electrode being connected to said first output terminal;

a third resistive element connected on one end to said first input terminal and on its other end to said collector electrode; and a triggering element connected on one end to said gate electrode and on its other end to the junction formed by said first resistive element and said capacitive element.

6. A switching circuit as described in claim 5 further comprising, rectifying means connected to said input terminals to convert A.C. signals to pulsating D.C. signals.

7. A switching circuit as described in claim 5 further comprising, a diode intermediate said emitter element and said first output terminal, said diode being poled to conduct current toward said first output terminal.

References Cited

UNITED STATES PATENTS

| | | | |
|---|---|---|---|
| 3,124,698 | 3/1964 | Semmer et al. | 307—51 |
| 3,295,052 | 12/1966 | Martin. | |
| 3,359,434 | 12/1967 | Galluzzi | 323—22 X |
| 3,371,262 | 2/1968 | Bird et al. | 321—11 |

J D MILLER, Primary Examiner

G. GOLDBERG, Assistant Examiner

U.S. Cl. X.R.

321—18; 323—36, 38